May 8, 1951  J. F. EGAN ET AL  2,552,266
APPARATUS FOR PHOTOGRAPHICALLY COPYING EITHER
BOTH OR ONLY ONE SIDE OF A DOCUMENT
Filed May 27, 1947  4 Sheets-Sheet 3

John F. Egan
George S. Jones
INVENTORS

Patented May 8, 1951

2,552,266

UNITED STATES PATENT OFFICE 2,552,266

APPARATUS FOR PHOTOGRAPHICALLY COPYING EITHER BOTH OR ONLY ONE SIDE OF A DOCUMENT

John F. Egan and George S. Jones, Rochester, N. Y., assignors to Eastman Kodak Company, Rochester, N. Y., a corporation of New Jersey Application May 27, 1947, Serial No. 750,832

36 Claims. (Cl. 88—24)

This invention relates to the photographic copying of documents and more particularly to an apparatus in which either both or only one side of the document may be copied.

Heretofore in document copying machines, the copying of both or only one side of a document necessitated a machine in which the camera or film unit occupied one position for photographing both sides of the document and a second position for copying only one side of the document. This arrangement required additional or extended drives for moving the film and document in synchronism. Another arrangement for providing a duplex type of machine was to maintain the camera in a fixed position for copying either both or only one side of the document, but then rearranging the reflecting system for copying only one side of the document. In this instance a change in the rate of movement of the film with respect to the movement of the document had to also be made. In both cases, the change-over from photographing both sides to only one side of the document required several changes in the set-up of the machine because of the difference in reduction of the document image. These changes had to be made by the operator and also included the adjustment of the illuminating system for the document.

In the present invention, two cameras are used, one for photographing both sides of the document, and the other for photographing only one side of the document. The only operation required of the operator to change-over the machine from copying both sides to only one side of the document is the insertion of the proper camera on the hanger in the machine. The insertion of either camera on the hanger determines the rate of movement of the film in the camera, the rate of movement of the optical compensator for the identifying data with respect to the movement of the film and the proper illumination of the document.

The primary object of the invention, therefore, is to provide a document copying machine of the duplex type in which the movement of the film, the movement of an optical compensating means, and the illumination of the document is controlled by the camera inserted in the machine.

Another object of the invention is to provide a document copying machine of the duplex type in which one camera is used for photographing both sides of the document and a second camera is used for photographing only one side of the document.

A further object of the invention is to provide a document copying machine of the duplex type in which two cameras are utilized, one having its objective central with respect to the light sensitive material in the camera for photographing both sides of the document, and the other having its objective offset with respect to the center of the light sensitive material in the camera for photographing only one side of the document.

A still further object of the invention is to provide a document copying machine of the duplex type in which the plane of the film in either camera is parallel to the plane of the document for providing a machine of compact design.

And yet another object of the invention is to provide a document copying machine of the duplex type in which a reflecting means is positioned adjacent to and on each side of the document station and between the document station and the exposure station for directing the document images into the camera.

A further object of the invention is to provide a document copying machine of the duplex type in which an optical compensator is rotated to scan an identifying station and has a reflecting system for directing the scanned image into the exposure station.

Another object of the invention is to provide a document copying machine of the duplex type in which the film in either camera is driven in synchronism with the movement of the document.

A still further object of the invention is to provide a document copying machine of the duplex type in which the camera inserted into the machine selects the proper drive mechanism for moving the film in synchronism with the movement of the document.

And yet another object of the invention is to provide a document copying machine of the duplex type in which the camera inserted into the machine selects the proper drive mechanism for rotating the optical compensator at the proper rate in accordance with the movement of the film in the camera.

And still another object of the invention is to provide a document copying machine of the duplex type in which the film advancing mechanism and the drive mechanism for the optical compensator are normally positioned for photographing both sides of the document and are changed over for photographing only one side of the document by a control member which is actuated only when the proper camera is positioned on the hanger.

And another object of the invention is to provide a document copying machine of the duplex type in which the document is normally illuminated on both sides with a predetermined intensity for photographing both sides of the document and illuminated on only one side at an intensity different from the predetermined intensity for photographing only one side of the document.

A further object of the invention is to provide a document copying machine of the duplex type in which the document is normally illuminated on both sides and illuminated on one side only when the proper camera is positioned on the hanger.

These and other objects of the invention will be apparent from the description which follows.

The above objects of the invention are embodied in an apparatus for photographically copying either both or only one side of a document and in which a document is supported in and continuously moved through a photographic station. The document is illuminated by two banks of lamps in parallel circuit and arranged on each side of the photographing station. Each bank of lamps has a variable resistance in series therewith for maintaining the lamps at a predetermined intensity when photographing both sides of the document. A variable resistance in parallel with one of the first mentioned resistances permits the adjustment of that bank of lamps to a different intensity when photographing only one side of the document. A mirror is positioned adjacent and on each side of the photographing station and between the photographing station and the camera for directing the image of both sides or only one side of the document into the camera. A camera, which supports the film or light sensitive material in a plane parallel to the plane of the document when the document is in the photographing station, has an objective with its axis centrally of the material for projecting the images of the document onto the material in spaced-apart relationship. A second camera, which also supports the light-sensitive material in a plane parallel to the plane of the document when the document is in the photographing station, has an objective with its axis offset with respect to the center of the material for projecting the image of only one side of the document onto the material. A hanger is provided to support either of the cameras in optical relation to the mirrors. A switch on the hanger energizes the circuit for both banks of lamps and is adapted to be actuated by the second camera when in position on the hanger for energizing the bank of lamps for illuminating only one side of the document. The advancing means for the light-sensitive material is operatively connected to the document drive mechanism for normally moving the material at a synchronous rate with respect to the movement of the document. An optical compensator is positioned to scan an identifying station with data and to direct the scanned image by means of an optical reflecting system into the camera. A drive mechanism is operatively connected to the advancing means for the material for rotating the optical compensating means at a normal predetermined rate and selectively at a decreased rate with respect to the movement of the light sensitive material. A control means connected to the advancing means for the material and the drive mechanism for the optical compensating means is adapted to be actuated by the second camera when in position on the hanger for selectively permitting the material to be moved at an increased synchronous rate with respect to the movement of the document and the optical compensating means to be rotated at a decreased rate with respect to the movement of the material.

Reference is now made to the accompanying drawings wherein similar reference characters designate similar parts and wherein.

Figures 1, 2, 3:
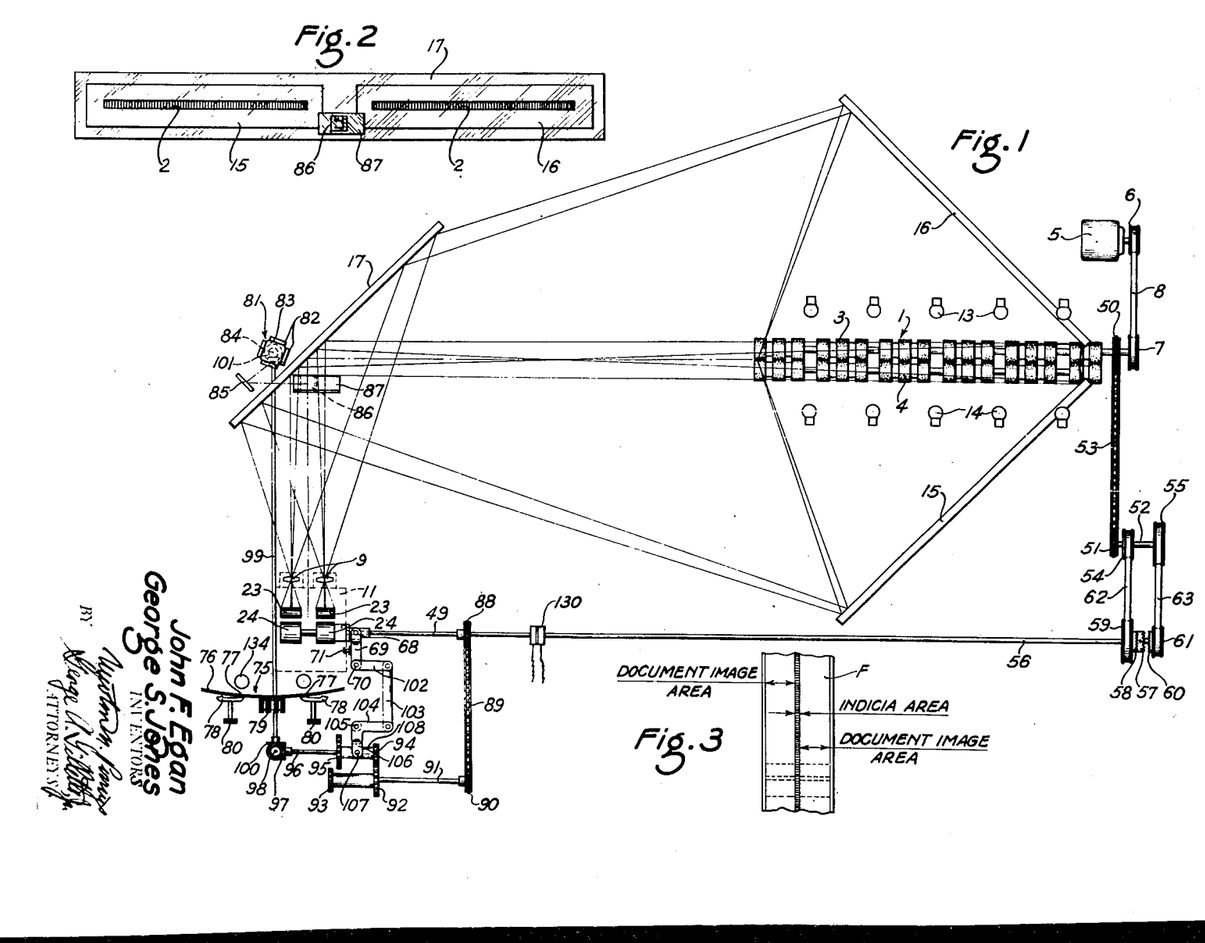
Fig. 1 is a diagrammatic view of the document copying machine incorporating the invention and showing the optical system for the document and identifying station, the ray paths of the system when photographing both sides of the document, and the arrangement of the drive mechanisms for the document, the light-sensitive material and the optical compensating means.
Fig. 2 is a diagrammatic view of the reflecting systems when viewed from the exposure station of the camera for photographing both sides of a document.
Fig. 3 is a diagrammatic representation of a strip of light-sensitive material showing the exposure areas and location of the image areas when both sides of a document are photographed.

In the illustrated embodiment of the invention, the photographing station 1 comprises two aligned apertures 2, see Fig. 2, past which the document is moved by a plurality of rolls 3 and 4. The rolls 3 are driven by the motor 5 through the pulleys 6 and 7 and the endless belt 8. This drive mechanism serves to move the document continuously past the apertures 2 for photographing either one or both sides of the document as will be described hereinafter.

The exposure station comprises the focal planes of the objective lenses 9 and 10 in the cameras 11 and 12 respectively. The document is illuminated at the apertures 2 by the banks of lamps 13 and 14. The reflecting means comprises the mirrors 15 and 16 which are positioned adjacent to each side of the photographing station 1 and are angularly disposed with respect thereto for receiving the image of the reverse and obverse sides of the document, respectively, and for directing the images toward the exposure station. A second reflecting means comprises a third mirror 17 which is positioned between the mirrors 15 and 16 and the exposure station for receiving the document images from the mirrors 15 and 16 and for directing said images into the exposure station. From Fig. 1, it will be noted that the plane of the exposure station is parallel to the plane of the document when in the photographing station. With this arrangement of the reflecting system and the exposure and photographing stations, the camera or film unit is located at the side of the operator and provides for easy and quick removal or replacement of the camera by the operator.

Figures 4, 5, 6:
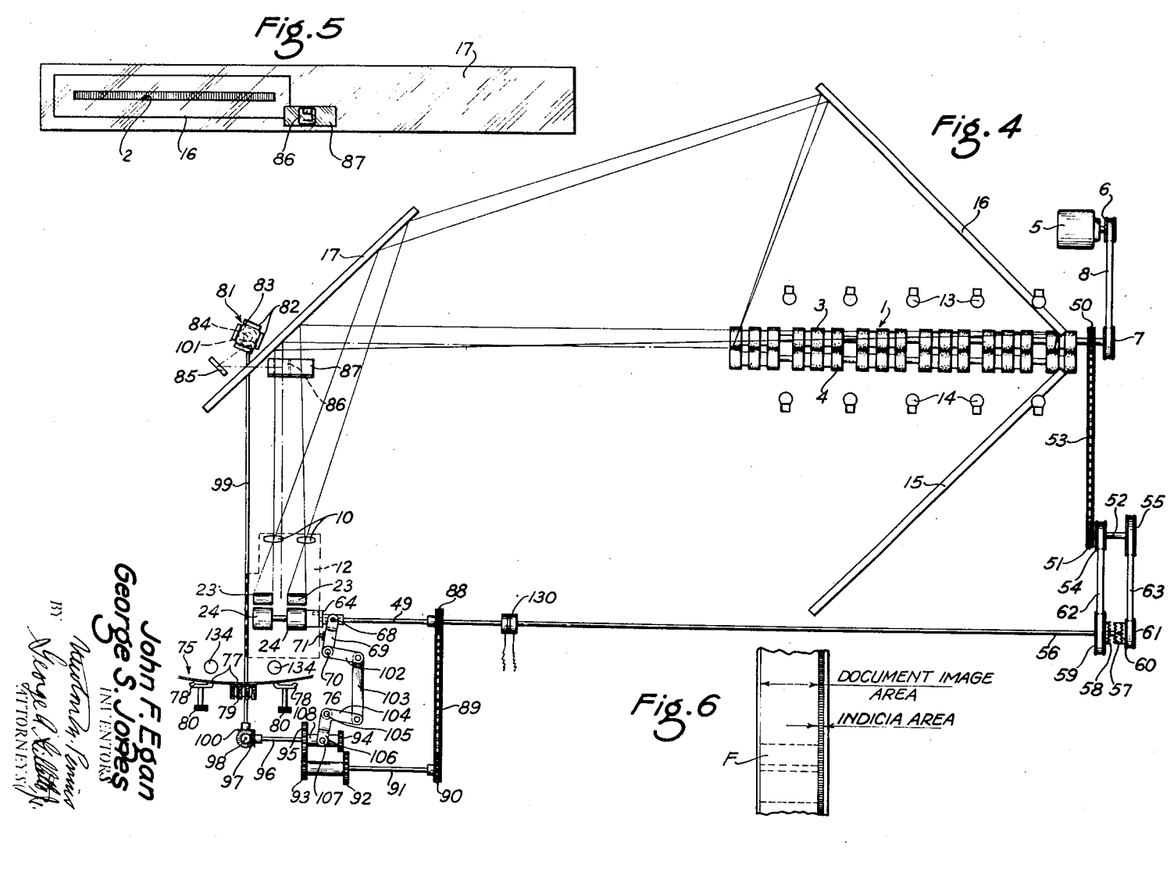
Fig. 4 is a view similar to Fig. 1 in which the ray paths are shown for photographing only one side of a document.
Fig. 5 is a diagrammatic view of the reflecting systems when viewed from the exposure station of the camera for photographing only one side of a document.
Fig. 6 is a diagrammatic representation of a strip of light-sensitive material showing the exposure areas and location of the image areas when only one side of a document is photographed.
Figure 8:
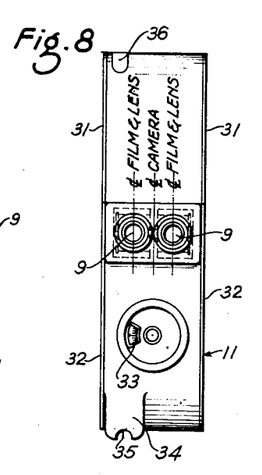
Fig. 8 is a front elevation of the camera or film unit for photographing both sides of a document and showing the axes of the objective lenses and film in alignment.
Figure 10:
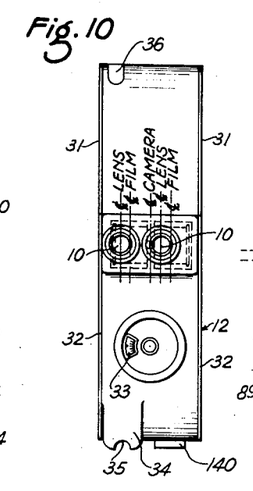
Fig. 10 is a front elevation of the camera or film unit shown in Fig. 9 and showing the off-set relationship between the axes of the objective lenses and the film.

The mirrors 15, 16, and 17 are fixed in position and so arranged that the diverging beams of light from the document are reflected into the objectives 9 and 10. In the camera 11, it will be noted from Figs. 1, 3, and 8, that the objective lenses 9 are aligned with the center of the film or light-sensitive material F and project the image of both sides of the document in spaced-apart relationship into the exposure station, see Fig. 3. The indicia area between the document images, as shown in Fig. 3, is for the identifying data which is projected into said area by an optical system to be described hereinafter. The camera 12, see Figs. 4, 6, and 10, has the objective lenses 10 off-set with respect to the center of the light-sensitive material F so that only one side of the document is projected into the exposure station. With reference to Fig. 6, it will be noted that the document image area is about twice the image area for one side of the document when photographing both sides of the document. The indicia area when photographing only one side of the document is along the edge of the material, as shown in Fig. 6, because of the off-set objective lenses 10.

The cameras 11 and 12 are provided with a supply reel shaft 20 on which the supply reel 21 is placed, and the light-sensitive material F is then threaded between the rolls 22, over the roll 23 which moves the material through the exposure station, around the drive roll 24 and under the pressure roll 25, around the loop-forming roll 26, around the roll 27, and is then secured to the take-up reel 28 on the shaft 29. The take-up shaft 29 is provided with a slotted end 30 for driving the take-up reel in a manner to be described. Hinged cover members 31 and 32 are provided on each side of the camera for loading both sides with film if duplicate records are required. The footage indicator 33 operates off the supply reel and indicates the footage on either reel when only one exposure is made, or the reel having the least film thereon when two exposures are made. Both cameras also are provided with extensions 34 having arcuate portions 35 and recesses 36.

Figure 13:
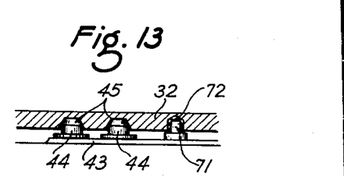
Fig. 13 is a partial detail view of the code pins on the hanger and the holes provided in one of the covers of the camera shown in Fig. 7 for accepting the code pins and the actuating member of the control means.
Figure 14:
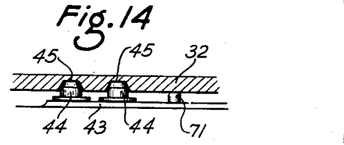
Fig. 14 is a partial detail view of the code pins on the hanger and the holes provided in one of the covers of the camera for accepting the code pins but causing the actuation of the control means.

The hanger means comprises a cast plate member 37 mounted on the machine frame in a manner not disclosed and having a rod 38 extending across the bottom thereof and journaled in the extensions 39. A U-shape spring mounted member 40 is pivotally mounted at 41 on the plate 37 and has pins 42 extending therefrom. The cameras 11 and 12 are mounted with the arcuate portions 35 of the extensions 34 engaging the rod 38 and are held thereon by the pins 42 engaging the recesses 36. In order to insure that the proper cameras are inserted in the machine, the plate member 37 has a boss 43 on which the pins 44 are located in a particular position with corresponding holes 45 drilled blind in the covers 32. If the proper camera is not inserted in the machine, the holes 45 and pins 44 will not be aligned and the camera cannot be moved against the plate 37 so pins 42 will engage the recesses 36, see Figs. 13 and 14.

Figure 7:
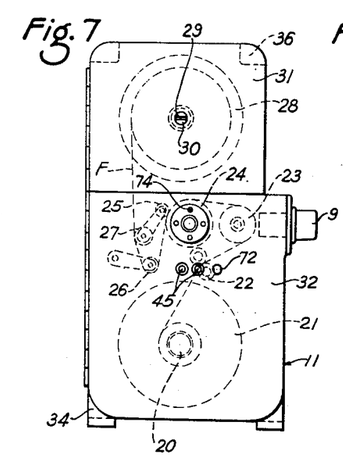
Fig. 7 is a side elevation of the camera or film unit for photographing both sides of a document.
Figure 9:
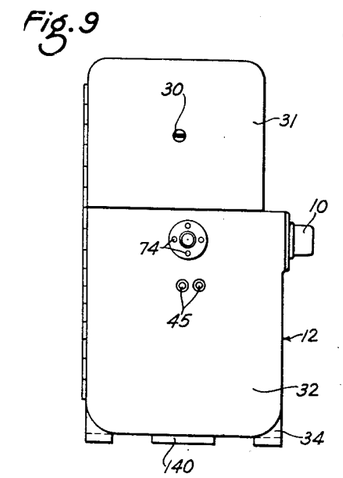
Fig. 9 is a side elevation of the camera or film unit for photographing only one side of a document.
Figures 16, 18:
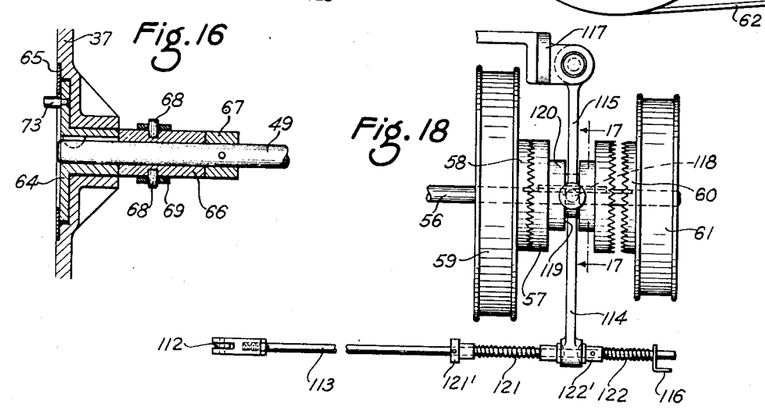
Fig. 16 is a vertical section through the film advancing shaft and showing an arrangement whereby the shaft may be shifted axially to cause the clutch member, shown in Fig. 1, to engage either of the drive means connected to the document drive mechanism.
Fig. 18 is a plan view of the embodiment shown in Fig. 17.

The advancing means for the light-sensitive material in the camera comprises a sprocket 50, on the shaft for the rolls 3, which drives the sprocket 51 on the stub shaft 52 by means of the chain 53, see Figs. 1 and 4. The stub shaft has keyed thereto the pulleys 54 and 55. A shaft 56 which extends across the machine has keyed thereto at one end a clutch member 57 with two serrated engaging faces. The clutch member 57 is adapted to normally engage the serrated hub 58 on the pulley 59 and, selectively, the serrated hub 60 on the pulley 61. The pulleys 59 and 61 are loosely mounted on the shaft 56 and connected to the pulleys 54 and 55, respectively, by the belts 62 and 63. The other end of the shaft 56 is keyed in the magnetic clutch 130, and the shaft 49 extends from the clutch 130 into the drive sleeve 64 which is retained in the plate 37 by the plate 65, as shown in Fig. 16. The shaft 49 is keyed to the sleeve 64 for axial movement to move the shaft 56 and carries a free sleeve 66 which is retained in position by the collar 67. The sleeve 66 has pins 68 extending therefrom for engaging the bifurcated lever 69 which is mounted on the shaft 70. The lever 69 has a pin 71 which either enters the hole 72 provided in the camera 11 thereby maintaining the various parts associated therewith in the positions shown in Fig. 1, or abuts the cover 32 of the camera 12 to be pivoted to a position shown in Fig. 4. The drive sleeve 64 carries a pin 73 which is adapted to engage any one of the apertures 74 in the film drive roll 24 when either of the cameras 11 or 12 are positioned on the plate 37, see Figs. 7, 9 and 11. In the preferred embodiment of the invention for controlling the film and optical compensating devices, the shaft 49 is not moved axially to move the shaft 56 axially for engaging the clutch 57 with the hub 60, as shown diagrammatically in Figs. 1 and 4. In the preferred embodiment the shafts 49 and 56 are fixed against axial movement, thereby permitting the take-up shaft 29 to be driven from the shaft 49 through the gears 46 and 47 and, at the same time, this arrangement does not complicate the design of the clutch 130.

The identifying station 75 comprises an arcuate plate 76 having a plurality of apertures 77 therein and in which a portion of the face of the identifying data members 78 and a counter or date member 79 are visible. The members 78 are rotatable by means of the knobs 80 for changing the data in the apertures 77 and the station is illuminated by the lamps 134 located below the plane of the apertures 77.

The optical compensating means 81 comprises a plurality of mirrors 82 which are mounted on a plate or block 83 fixed to the shaft 84 and so positioned that the mirrors 82 pass through the center of curvature of the arcuate plate 76 when rotated. As the mirrors 82 are rotated, they scan the identifying station 75 and direct the image thereof into the mirror 85 for directing the same image into the mirror 86. The mirror 86 directs the scanned reflected image out of the plane of the identifying station and into the mirror 87 which directs the image into the exposure station, see Figs. 1, 2, 4, and 5. It will be noted from Figs. 3 and 6, that the scanned image of the identifying station is projected by the central objectives 9 between the images of the obverse and reverse sides of the document when photographing both sides of the document and by the offset objective 10 to one side of the document image when photographing only one side of the document.

The drive means for rotating the optical compensating means 81, see Figs. 1 and 4, comprises a sprocket 88 on the shaft 49 which is connected by the chain 89 to the sprocket 90 on the shaft 91. The shaft 91 has keyed thereto the integral gears 92 and 93 which mesh, respectively, with the integral gears 94 and 95 which are keyed to and movable along the shaft 96 for a purpose to be more fully disclosed hereinafter. The shaft 96 drives the vertical shaft 97 by means of the mitre gears 98, and the shaft 97 drives the horizontal shaft 99 through the mitre gears 100. The vertical shaft 83 is then driven by the mitre gears 101 at the lower end of the shaft to rotate the mirrors 82.

The control means for changing the rate of film movement and the rate at which the optical compensating means is rotated comprises the levers 69 and 102 on the shaft 70, the connecting link 103 and the bell crank lever 104 which is pivotally mounted at 105. The lever 104 has a bifurcated end 106 which engages the pins 107 in the common hub 108 for the gears 95 and 94. As shown in Fig. 1, the pin 71 is in the hole 72 in the camera 11, and the gears 92 and 94 are meshed to rotate the mirrors 82 at a normal rate with respect to the movement of the film. The ratios of the speed of the gears 92 and 94 and the shafts 49 and 91 are such that the apparent movement of the image of the identifying station on the film is the same as that of the image of the document on the film. When the camera 12 for photographing only one side of the document is positioned on the hanger plate 37, the lever 104 is pivoted about 105 to move the gears 94 and 95 along the shaft 96 thereby disengaging the gear 94 from the gear 92 and meshing the gear 95 with gear 93, see Fig. 4.

It can be readily noted from Figs. 3 and 6 that when only one side of the document is being photographed, the image in the film is larger because of a smaller reduction and, hence, the movement of the film must be increased in order to maintain the rate of film movement and document movement in synchronism. It is for this reason that the drive for the film is shifted from the pulleys 54 and 59 to the pulleys 55 and 61. Since the mirrors 82 are also driven from the shaft 56, it is necessary to decrease the speed of the mirrors 82 by the same amount that the film drive is increased so that the mirrors 82 will be rotated at the same speed as when photographing both sides of a document, and so that the speed of the identifying station image will be apparently the same as that of the document image. This is accomplished when the camera 12 for photographing only one side of a document is positioned on the hanger plate 37. The lever 104 is pivoted about 105 to move the gears 94 and 95 along the shaft 96 thereby disengaging the gear 94 from the gear 92 and meshing the gear 95 with gear 93. The mirrors 82 will now be rotated at the same speed as when photographing both sides of a document but will be rotated at a decreased rate with respect to the movement of the film. From the above description, it can be readily appreciated that the camera placed in position on the hanger 37 determines the rate of film movement and rate of rotation of the optical compensating means 81 with respect to the film movement.

Figure 11:
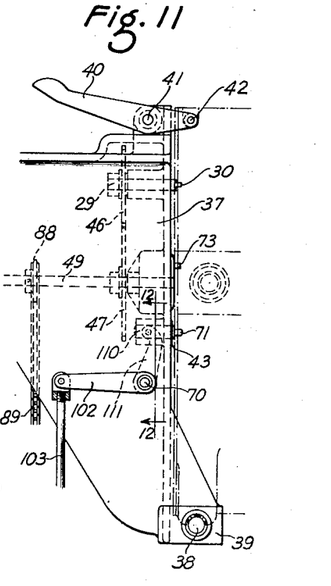
Fig. 11 is a side elevation of the hanger means for supporting either of the cameras or film units.
Figure 12:
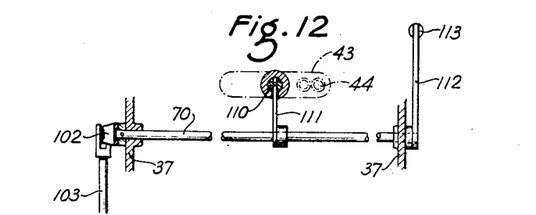
Fig. 12 is a partial sectional view taken substantially on the line 12—12 of Fig. 11 and showing the control means on the hanger for actuating the advancing means for the film and the selector means for the optical compensator drive mechanism.

The preferred embodiment of the control means is disclosed in Figs. 11, 15, 17 and 18, in which an actuating member 110 is mounted in the plate 37 and is connected to the shaft 70 by the link 111. The shaft 70 has fixed to one end thereof the lever 102 which is also connected to the bifurcated end of the lever or rod 103 for operation in a manner already described. The other end of the shaft 70 has fixed thereto a lever 112 which engages a rod 113 extending parallel to the shaft 56. The rod 113 extends through the arm 114 of the yoke 115 and has its end journaled in the angle bracket 116. The yoke 115 is pivotally mounted in the bracket 117 and carries pins 118 which engage the slot 119 in the reduced portion 120 of the clutch member 57. The clutch 57 is maintained in its normal position, i. e., in engagement with the hub 58 by the compression coil springs 121 and 122. When the camera 11 is positioned on the hanger 37, the actuating member 110 enters the hole 72 to maintain all of the parts in their normal positions, as shown in Figs. 1, 11, 17 and 18. When the camera 12 is positioned on the hanger 37 for photographing only one side of the document, the actuating member 110 is moved to the left, as shown in Fig. 11, thereby rotating the shaft 70 and the levers 102 and 112 in a counterclockwise direction to change the drive for the optical compensating means 81 as already described and to move the rod 113 to the right, as viewed in Fig. 18. As the rod 113 is moved to the right, the collars 121' and 122', which are pinned thereto, compress the springs 121 and 122 to move the arm 114 with the rod 113. The movement of the arm 114 pivots the yoke 115 on the bracket 117, and by means of the pins 118 and slot 119, the clutch 57 is moved into engagement with the hub 60 to increase the film speed and to maintain the rate of movement of the film in synchronism with the movement of the document.

Figures 15, 17, 19:
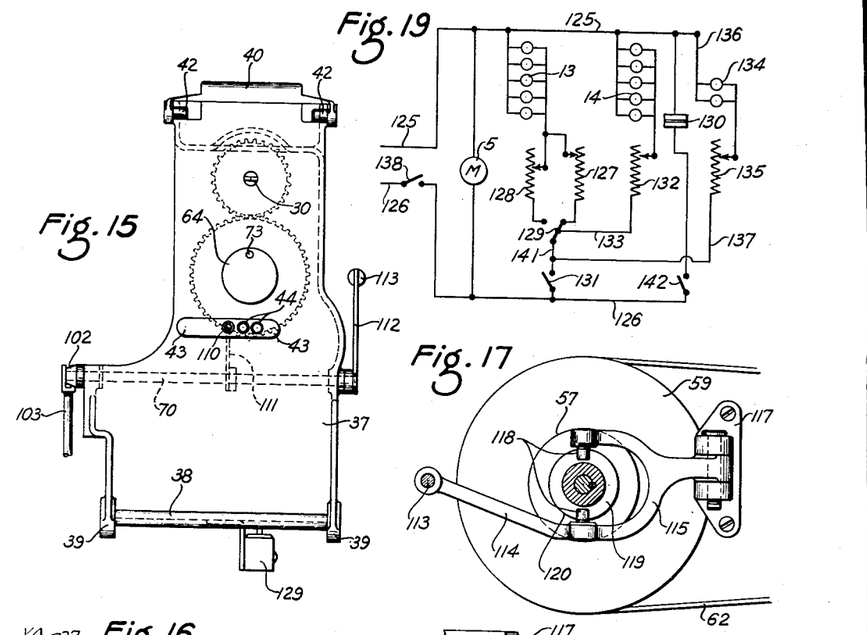
Fig. 15 is a front elevation of the hanger for supporting either of the cameras or film units.
Fig. 17 is a vertical section through the preferred embodiment for changing the rate of film movement with respect to the document.
Fig. 19 is a wiring diagram of the lamp bank circuits showing the arrangement for maintaining different lamp bank intensities and the switch means actuated by one of the cameras for energizing only one of the lamp banks.

When photographing both sides of a document, it has been found that a different intensity of illumination is required than when photographing only one side of the document because of the light transmitted through the document. In the present invention, the illumination also is controlled by the camera positioned on the hanger 37. With reference to Fig. 19 it will be noted that the lamps 13 and 14 are in parallel across the lines 125 and 126. The lamps 13 have a variable resistance 127 and 128 connected in parallel with each other and in series with the lamps, the double-throw switch 129, and the switch 131 across the lines 125 and 126. The lamps 14 also have a variable resistance 132 in series therewith which is connected by the line 133 to a contact on the same side of the switch 129 as the resistance 127. The lamps 134 for illuminating the identifying station 75 are in parallel connected into the line 125 by the line 136. A variable resistance 135 is in series with the lamps 134 and is connected by the line 137 into the line 141. The motor 5 and the electromagnet clutch 130 are also connected in parallel across the lines 125 and 126. The resistances 127, 128, 132, and 135 are adjusted to give the proper illumination intensity and then locked in position.

When the switch 138 is closed to energize the circuit shown in Fig. 19, the motor 5 is energized to drive the rolls 3, and the pulley 59, and the shaft 56, when the camera 11 is placed on the hanger 37, the switch means 129 remains in its normal position, as shown in Fig. 19. As a document is moved into the photographing station 1 by the rolls 3 and 4, the leading edge actuates a plurality of fingers, in a well-known manner, to hold the switches 131 and 142 in their closed positions thereby energizing the lamps 13 and 14 through the resistances 127 and 132, the lamps 134 through the resistance 135, and energizing the clutch 130 to drive the shaft 49 and, hence, the film in the camera and the optical compensating means 81. When the trailing edge of the document leaves the fingers, the switches 131 and 142 are opened to de-energize the lamps 13, 14 and 134 and the clutch 130. When only one side of a document is to be photographed, the camera 12 is positioned on the hanger 37, and the block 149 on the underside thereof actuates the switch 129 so that only the lamps 13 will be energized through the resistance 128 when the switch 131 is closed by the document as it approaches the photographing station 1. The switch 142 as when photographing both sides of a document is closed to energize the clutch 130 and the lamps 134 are also flashed by the tripping of the switch 131 by the documents.

Since other modifications of the construction shown are possible, the scope of the invention is not to be limited to the illustrated embodiments but is defined by the appended claims.

We claim:

1. An apparatus for photographically copying a document and having a photographing station and an exposure station, comprising means for supporting the document in said photographing station, a drive means for moving the document through said photographing station, a camera adapted to support a light sensitive material in said exposure station and having an objective for projecting a reduced image of the document onto said material, a second camera adapted to support a light sensitive material in said exposure station and having an objective for projecting an image of the document of smaller reduction than said first camera onto said material, a hanger means for supporting either of said cameras in optical relation to said photographing station, an advancing means for said light sensitive material operatively connected to said drive means for normally moving said material at a synchronous rate with respect to the movement of the document and selectively at an increased synchronous rate with respect to the movement of the document, and a control means operatively connected to said advancing means and adapted to be actuated by said second camera when in position on said hanger means for selectively permitting said material to be moved at an increased synchronous rate with respect to the movement of the document.

2. An apparatus for photographically copying a document and having a photographing station and an exposure station, comprising means for supporting the document in said photographing station, a drive means for moving the document through said photographing station, a reflecting system for directing the image of the document into said exposure station, a camera adapted to support a light sensitive material in said exposure station and having an objective for projecting a reduced image of the document onto said material, a second camera adapted to support a light sensitive material in said exposure station and having an objective for projecting an image of the document of a smaller reduction than said first camera onto said material, a hanger means for supporting either of said cameras in optical relation to said photographing station and reflecting system, an advancing means for said light sensitive material operatively connected to said drive means for normally moving said material at a synchronous rate with respect to the movement of the document and selectively at an increased synchronous rate with respect to the movement of the document, and a control means operatively connected to said advancing means and adapted to be actuated by said second camera when in position on said hanger means for selectively permitting said material to be moved at an increased synchronous rate with respect to the movement of the document.

3. An apparatus for photographically copying a document and having a photographing station and an exposure station, comprising means for supporting the document in said photographing station, a drive means for moving the document through said photographing station, a reflecting system for directing the image of the document into said exposure station, a camera adapted to support a light sensitive material in said exposure station and having an objective for projecting a reduced image of the document onto said material, a second camera adapted to support a light sensitive material in said exposure station and having an objective for projecting an image of the document of a smaller reduction than said first camera onto said material, a hanger means for supporting either of said cameras in optical relation to said photographing station and reflecting system, an advancing means for said light sensitive material operatively connected to said drive means for normally moving said material at a synchronous rate with respect to the movement of the document, selector means associated with said advancing means for selectively moving said material at an increased synchronous rate with respect to the movement of the document, and a control means operatively connected to said selector means and adapted to be actuated by said second camera when in position on said hanger means for selectively permitting said material to be moved at an increased synchronous rate with respect to the movement of the document.

4. An apparatus for photographically copying either one or both sides of a document and having a photographing station and an exposure station, comprising means for supporting the document in said photographing station, a drive means for moving the document through said photographing station, reflecting means adjacent and on each side of said photographing station for receiving respectively the images of the obverse and reverse sides of the document in said photographing station and for directing said images into said exposure station, a camera adapted to support a light sensitive material in said exposure station and having an objective with an axis centrally of said material for projecting the images of both sides of the document onto said material, a second camera adapted to support a light sensitive material in said exposure station and having an objective offset with respect to the center of said material for projecting the image of only one side of the document onto said material, a hanger means for supporting either of said cameras in optical relation to said photographing station and reflecting means, an advancing means for said light sensitive material operatively connected to said drive means for normally moving said material at a synchronous rate with respect to the movement of the document, selector means associated with said advancing means for selectively moving said material at an increased synchronous rate with respect to the movement of the document, and a control means operatively connected to said selector means and adapted to be actuated by said second camera when in position on said hanger means for selectively permitting said material to be moved at an increased synchronous rate with respect to the movement of the document.

5. An apparatus for photographically copying either one or both sides of a document and having a photographing station and an exposure station, comprising means for supporting the document in said photographing station, a drive means for moving the document through said photographing station, reflecting means adjacent and on each side of said photographing station for receiving respectively the images of the obverse and reverse sides of the document in said photographing station and for directing said images into said exposure station, a camera adapted to support a light sensitive material in said exposure station and having an objective with an axis centrally of said material for projecting the images of both sides of the document onto said material, a second camera adapted to support a light sensitive material in said exposure station and having an objective offset with respect to the center of said material for projecting the image of only one side of the document onto said material, a hanger means for supporting either of said cameras in optical relation to said photographing station and reflecting means, an advancing means for said light sensitive material operatively connected to said drive means and including two supplementary drive means adapted to be operatively connected to said cameras when positioned on said hanger means, selector means normally engaging one of said supplementary drive means for moving said material at a synchronous rate with respect to the movement of the document and adapted to selectively engage the other of said supplementary drive means for moving said material at an increased synchronous rate with respect to the movement of the document, and a control means operatively connected to said selector means and adapted to be actuated by said second camera when in position on said hanger means for engaging the selector means with the supplementary drive means for moving said material at an increased synchronous rate.

6. An apparatus for photographically copying either one or both sides of a document and having a photographing station and an exposure station, comprising means for supporting the document in said photographing station, a drive means for continuously moving the document through said photographing station, reflecting means adjacent and on each side of said photographing station for receiving respectively the images of the obverse and reverse sides of the document in said photographing station, a second reflecting means positioned between said reflecting means and said exposure station for receiving the obverse and reverse images of the document and for directing said images into said exposure station, a camera adapted to support a light sensitive material in said exposure station in a plane parallel to the plane of the document when in said photographing station and having an objective with an axis centrally of said material for projecting the images of both sides of the document onto said material, a second camera adapted to support a light sensitive material in said exposure station in a plane parallel to the plane of the document when in said photographing station and having an objective offset with respect to the center of said material for projecting the image of only one side of the document onto said material, a hanger means for supporting either of said cameras in optical relation to said photographing station and reflecting means, an advancing means for said light sensitive material operatively connected to said drive means and including two supplementary drive means adapted to be operatively connected to said cameras when positioned on said hanger means, a clutch means normally engaging one of said supplementary drive means for moving said material at a synchronous rate with respect to the movement of the document and adapted to selectively engage the other of said supplementary drive means for moving said material at an increased synchronous rate, and an actuating member on said hanger means operatively connected to said clutch means and adapted to be actuated by said second camera when in position on said hanger means for moving said clutch means into engagement with the supplementary drive means for moving said material at an increased synchronous rate.

7. An apparatus for photographically copying a document and having a photographing station and an exposure station, comprising means for supporting the document in said photographing station, a drive means for moving the document through said photographing station, a camera adapted to support a light sensitive material in said exposure station and having an objective for projecting a reduced image of the document onto said material, a second camera adapted to support a light sensitive material in said exposure station and having an objective for projecting an image of the document onto said material of smaller reduction than said first camera, a hanger means for supporting either of said cameras in optical relation to said photographing station, an advancing means for said light sensitive material operatively connected to said drive means for normally moving said material at a synchronous rate with respect to the movement of the document and selectively at an increased synchronous rate with respect to the movement of the document, an identifying station having identifying data, an optical compensating means adapted to be rotated for scanning said identifying station and for directing the scanned image into said exposure station, a second drive means operatively connected to said advancing means for rotating said optical compensating means at a normal predetermined rate and selectively at a decreased rate with respect to the movement of said material, and a control means operatively connected to said advancing means and second drive means and adapted to be actuated by said second camera when in position on said hanger means for selectively permitting said material to be moved at the increased synchronous rate and said optical compensating means to be rotated at the decreased rate.

8. An apparatus for photographically copying a document and having a photographing station and an exposure station, comprising means for supporting the document in said photographing station, a drive means for moving the document through said photographing station, a reflecting system for directing the image of the document into said exposure station, a camera adapted to support a light sensitive material in said exposure station and having an objective for projecting a reduced image of the document onto said material, a second camera adapted to support a light sensitive material in said exposure station and having an objective for projecting an image of the document onto said material of a smaller reduction than said first camera, a hanger means for supporting either of said cameras in optical relation to said photographing station and reflecting system, an advancing means for said light sensitive material operatively connected to said drive means for normally moving said material at a synchronous rate with respect to the movement of the document and selectively at an increased synchronous rate with respect to the movement of the document, an identifying station having identifying data, an optical compensating means adapted to be rotated for scanning said identifying station, a second reflecting system positioned to receive the scanned image from said optical compensating means and for directing said image into said exposure station, a second drive means operatively connected to said advancing means for rotating said optical compensating means at a normal predetermined rate and selectively at a decreased rate with respect to the movement of said material, and a control means operatively connected to said advancing means and second drive means and adapted to be actuated by said second camera for selectively permitting said material to be moved at the increased synchronous rate and said optical compensating means to be rotated at the decreased rate.

9. An apparatus for photographically copying a document and having a photographing station and an exposure station, comprising means for supporting the document in said photographing station, a drive means for moving the document through said photographing station, a reflecting system for directing the image of the document into said exposure station, a camera adapted to support a light sensitive material in said exposure station and having an objective for projecting a reduced image of the document onto said material, a second camera adapted to support a light sensitive material in said exposure station and having an objective for projecting an image of the document onto said material of a smaller reduction than said first camera, a hanger means for supporting either of said cameras in optical relation to said photographing station and reflecting system, an advancing means for said light sensitive material operatively connected to said drive means for normally moving said material at a synchronous rate with respect to the movement of the document, selector means associated with said advancing means for selectively moving said material at an increased synchronous rate with respect to the movement of the document, an identifying station having identifying data, an optical compensating means adapted to be rotated for scanning said identifying station, a second reflecting system positioned to receive the scanned image from said optical compensating means and for directing said image into said exposure station, a second drive means operatively connected to said advancing means for normally rotating said optical compensating means at a predetermined rate, a second selector means associated with said second drive means for selectively rotating said optical compensating means at a decreased rate with respect to the movement of said material, and a control means operatively connected to both of said selector means and adapted to be actuated by said second camera when in position on said hanger means for selectively permitting said material to be moved at the increased synchronous rate and said optical compensating means to be rotated at the decreased rate.

10. An apparatus for photographically copying either one or both sides of a document and having a photographing station and an exposure station, comprising means for supporting the document in said photographing station, a drive means for moving the document through said photographing station, reflecting means adjacent and on each side of said photographing station for receiving respectively the images of the obverse and reverse sides of the document in said photographing station and for directing said images into said exposure station, a camera adapted to support a light sensitive material in said exposure station and having an objective with an axis centrally of said material for projecting the images of both sides of the document onto said material, a second camera adapted to support a light sensitive material in said exposure station and having an objective offset with respect to the center of said material for projecting the image of only one side of the document onto said material, a hanger means for supporting either of said cameras in optical relation to said photographing station and reflecting means, an advancing means for said light sensitive material operatively connected to said drive means for normally moving said material at a synchronous rate with respect to the movement of the document, selector means associated with said advancing means for selectively moving said material at an increased synchronous rate with respect to the movement of the document, an identifying station having identifying data, an optical compensating means adapted to be rotated for scanning said identifying station, a reflecting system positioned to receive the scanned image from said optical compensating means and for directing said image into said exposure station, a second drive means operatively connected to said advancing means for normally rotating said optical compensating means at a predetermined rate, a second selector means associated with said second drive means for selectively rotating said optical compensating means at a decreased rate with respect to the movement of said material, and a control means operatively connected to both of said selector means and adapted to be actuated by said second camera when in position on said hanger means for selectively permitting said material to be moved at the increased synchronous rate and said optical compensating means to be rotated at the decreased rate.

11. An apparatus for photographically copying either one or both sides of a document and having a photographing station and an exposure station, comprising means for supporting the document in said photographing station, a drive means for moving the document through said photographing station, reflecting means adjacent and on each side of said photographing station for receiving respectively the images of the obverse and reverse sides of the document in said photographing station and for directing said images into said exposure station, a camera adapted to support a light sensitive material in said exposure station and having an objective with an axis centrally of said material for projecting the images of both sides of the document onto said material, a second camera adapted to support a light sensitive material in said exposure station and having an objective offset with respect to the center of said material for projecting the image of only one side of the document onto said material, a hanger means for supporting either of said cameras in optical relation to said photographing station and reflecting means, an advancing means for said light sensitive material operatively connected to said drive means and including two supplementary drive means adapted to be operatively connected to said cameras when positioned on said hanger means, selector means normally engaging one of said supplementary drive means for moving said material at a synchronous rate with respect to the movement of the document and adapted to selectively engage the other of said supplementary drive means for moving said material at an increased synchronous rate with respect to the movement of the document, an identifying station having identifying data, an optical compensating means adapted to be rotated for scanning said identifying station, a reflecting system positioned to receive the scanned image from said optical compensating means and for directing said image into said exposure station, an auxiliary drive means operatively connected to said advancing means and including a selective speed drive adapted to rotate said optical compensating means at a normal predetermined rate and to selectively rotate said optical compensating means at a slower rate with respect to the movement of said material, and a control means operatively connected to said selector means and selective speed drive and adapted to be actuated by said second camera when in position on said hanger means for engaging the selector means with the supplementary drive means for moving said material at the increased synchronous rate and for selectively changing said selective speed drive to rotate said optical compensating means at the slower rate.

12. An apparatus for photographically copying either one or both sides of a document and having a photographing station and an exposure station, comprising means for supporting the document in said photographing station, a drive means for continuously moving the document through said photographing station, reflecting means adjacent and on each side of said photographing station for receiving respectively the images of the obverse and reverse sides of the document in said photographing station, a second reflecting means positioned between said reflecting means and said exposure station for receiving the obverse and reverse images of the document and for directing said images into said exposure station, a camera adapted to support a light sensitive material in said exposure station in a plane parallel to the plane of the document when in said photographing station and having an objective with an axis centrally of said material for projecting the images of both sides of the document onto said material, a second camera adapted to support a light sensitive material in said exposure station in a plane parallel to the plane of the document when in said photographing station and having an objective offset with respect to the center of said material for projecting the image of only one side of the document onto said material, a hanger means for supporting either of said cameras in optical relation to said photographing station and reflecting means, an advancing means for said light sensitive material operatively connected to said drive means and including two supplementary drive means adapted to be operatively connected to said cameras when positioned on said hanger means, a clutch means normally engaging one of said supplementary drive means for moving said material at a synchronous rate with respect to the movement of the document and adapted to selectively engage the other of said supplementary drive means for moving said material at an increased synchronous rate, an arcuate identifying station having identifying data, an optical compensating means including a plurality of mirrors adapted to be rotated through the center of curvature of said identifying station for scanning said identifying station, a reflecting system including a second plurality of mirrors positioned to receive the scanned image from said optical compensating means for directing said image into said exposure station, an auxiliary drive means operatively connected to said advancing means and including a selective speed drive adapted to rotate said optical compensating means at a normal predetermined rate and to selectively rotate said optical compensating means at a slower rate with respect to the movement of said material, and an actuating member on said hanger means operatively connected to said clutch means and selective speed drive and adapted to be actuated by said second camera when in position on said hanger means for moving said clutch means into engagement with the supplementary drive means for moving said material at the increased synchronous rate and for selectively changing said selective speed drive to rotate said optical compensating means at the slower rate.

13. An apparatus for photographically copying either one or both sides of a document and having a photographing station and an exposure station, comprising means for supporting the document in said photographing station, a drive means for moving the document through said photographing station, reflecting means adjacent and on each side of said photographing station for receiving respectively the images of the obverse and reverse sides of the document in said photographing station and for directing said images into said exposure station, a camera adapted to support a light sensitive material in said exposure station and having an objective with an axis centrally of said material for projecting the images of both sides of the document onto said material, a second camera adapted to support a light sensitive material in said exposure station and having an objective offset with respect to the center of said material for projecting the image of only one side of the document onto said material, a hanger means for supporting either of said cameras in optical relation to said photographing station and reflecting means, illuminating means for normally illuminating both sides of the document when in said photographing station and adapted to selectively illuminate only one side of the document, and means associated with said illuminating means and adapted to be actuated by said second camera when in position on said hanger means for selectively illuminating only one side of the document.

14. An apparatus for photographically copying either one or both sides of a document and having a photographing station and an exposure station, comprising means for supporting the document in said photographing station, a drive means for moving the document through said photographing station, reflecting means adjacent and on each side of said photographing station for receiving respectively the images of the obverse sides of the document in said photographing station and for directing said images into said exposure station, a camera adapted to support a light sensitive material in said exposure station and having an objective with an axis centrally of said material for projecting the images of both sides of the document onto said material, a second camera adapted to support a light sensitive material in said exposure station and having an objective offset with respect to the center of said material for projecting the image of only one side of the document onto said material, a hanger means for supporting either of said cameras in optical relation to said photagraphing station and reflecting means, illuminating means for the document including banks of lamps arranged on each side of said photographing station, means associated with said banks of lamps for maintaining both of said banks at a predetermined intensity for illuminating both sides of a document and for maintaining one of said banks at a different intensity for illuminating only one side of a document, and a switch means associated with said banks of lamps for normally energizing both banks of lamps and adapted to be actuated by said second camera when in position on said hanger means for energizing the bank of lamps for illuminating only one side of the document.

15. An apparatus for photographically copying either one or both sides of a document and having a photographing station and an exposure station, comprising means for supporting the document in said photographing station, a drive means for moving the document through said photographing station, reflecting means adjacent and on each side of said photographing station for receiving respectively the images of the obverse and reverse sides of the document in said photographing station and for directing said images into said exposure station, a camera adapted to support a light sensitive material in said exposure station and having an objective with an axis centrally of said material for projecting the images of both sides of the document onto said material, a second camera adapted to support a light sensitive material in said exposure station and having an objective offset with respect to the center of said material for projecting the image of only one side of the document onto said material, a hanger means for supporting either of said cameras in optical relation to said photographing station and reflecting means, illuminating means for said document including two banks of lamps, each in parallel circuit, arranged on each side of said photographing station, and each having a variable resistance in series therewith for maintaining said lamps at a predetermined intensity for illuminating both sides of the document, a third variable resistance in parallel with one of said first mentioned resistances for maintaining one of said banks of lamps at a different intensity for illuminating only one side of the document, and a switch means associated with said banks of lamps for normally energizing both banks of lamps and adapted to be actuated by said second camera when in position on said hanger means for energizing the bank of lamps for illuminating only the one side of the document.

16. An apparatus for photographically copying either one or both sides of a document and having a photographing station and an exposure station, comprising means for supporting the document in said photographing station, a drive means for continuously moving the document through said photographing station, illuminating means for normally illuminating both sides of the document when in said photographing station and adapted to selectively illuminate only one side of the document, reflecting means adjacent and on each side of said photographing station for receiving respectively the images of the obverse and reverse sides of the document in said photographing station, a second reflecting means positioned between said reflecting means and said exposure station for receiving the obverse and reverse images of the document and for directing said images into said exposure station, a camera adapted to support a light sensitive material in said exposure station in a plane parallel to the plane of the document and having an objective with an axis centrally of said material for projecting the images of both sides of the document onto said material, a second camera adapted to support a light sensitive material in said exposure station in a plane parallel to the plane of the document when in said exposure station and having an objective offset with respect to the center of said material for projecting the image of only one side of the document onto said material, a hanger means for supporting either of said cameras in optical relation to said photographing station and reflecting means, means associated with said illuminating means and adapted to be actuated by said second camera when in position on said hanger means for selectively illuminating only one side of the document, an advancing means for said light sensitive material operatively connected to said drive means for normally moving said material at a synchronous rate with respect to the movement of the document and selectively at an increased synchronous rate with respect to the movement of the document, an identifying station having identifying data, an optical compensating means adapted to be rotated for scanning said identifying station and for directing the scanned image into said exposure station, a second drive means operatively connected to said advancing means for rotating said optical compensating means at a normal predetermined rate and selectively at a decreased rate with respect to the movement of said material, and a control means operatively connected to said advancing means and second drive means and adapted to be actuated by said second camera when in position on said hanger means for selectively permitting said material to be moved at the increased synchronous rate and said optical compensating means to be rotated at the decreased rate.

17. An apparatus for photographically copying either one or both sides of a document and having a photographing station and an exposure station, comprising means for supporting the document in said photographing station, a drive means for continuously moving the document through said photographing station, illuminating means for said document including banks of lamps arranged on each side of said photographing station, means associated with said banks of lamps for maintaining both of said banks at a predetermined intensity for illuminating both sides of a document and for maintaining one of said banks at a different intensity for illuminating only one side of a document, reflecting means adjacent and on each side of said photographing station for receiving respectively the images of the obverse and reverse sides of the document in said photographing station, a second reflecting means positioned between said reflecting means and said exposure station for receiving the obverse and reverse images of the document and for directing said images into said exposure station, a camera adapted to support a light sensitive material in said exposure station in a plane parallel to the plane of the document and having an objective with an axis centrally of said material for projecting the images of both sides of the document onto said material, a second camera adapted to support a light sensitive material in said exposure station in a plane parallel to the plane of the document when in said exposure station and having an objective offset with respect to the center of said material for projecting the image of only one side of the document onto said material, a hanger means for supporting either of said cameras in optical relation to said photographing station and reflecting means, a switch means associated with said banks of lamps for normally energizing both banks of lamps and adapted to be actuated by said second camera when in position on said hanger means for energizing the bank of lamps for illuminating only one side of the document, an advancing means for said light sensitive material operatively connected to said drive means for normally moving said material at a synchronous rate with respect to the movement of the document and selectively at an increased synchronous rate with respect to the movement of the document, an identifying station having identifying data, an optical compensating means adapted to be rotated for scanning said identifying station and for directing the scanned image into said exposure station, a second drive means operatively connected to said advancing means for rotating said optical compensating means at a normal predetermined rate and selectively at a decreased rate with respect to the movement of said material, and a control means operatively connected to said advancing means and second drive means and adapted to be actuated by said second camera when in position on said hanger means for selectively permitting said material to be moved at the increased synchronous rate and said optical compensating means to be rotated at the decreased rate.

18. An apparatus for photographically copying either one or both sides of a document and having a photographing station and an exposure station, comprising means for supporting the document in said photographing station, a drive means for continuously moving the document through said photographing station, illuminating means for said document, including two banks of lamps, each in parallel circuit, arranged on each side of said photographing station, and each having a variable resistance in series therewith for maintaining said lamps at a predetermined intensity for illuminating both sides of a document, a third variable resistance in parallel circuit with one of said first mentioned resistances for maintaining one of said banks of lamps at a different intensity for illuminating only one side of a document, reflecting means adjacent and on each side of said photographing station for receiving respectively the images of the obverse and reverse sides of the document in said photographing station, a second reflecting means positioned between said reflecting means and said exposure station for receiving the obverse and reverse images of the document and for directing said image into said exposure station, a camera adapted to support a light sensitive material in said exposure station in a plane parallel to the plane of the document and having an objective with an axis centrally of said material for projecting the images of both sides of the document onto said material, a second camera adapted to support a light sensitive material in said exposure station in a plane parallel to the plane of the document when in said exposure station and having an objective offset with respect to the center of said material for projecting the image of only one side of the document onto said material, a hanger means for supporting either of said cameras in optical relation to said photographing station and reflecting means, a switch means associated with said banks of lamps for normally energizing both banks of lamps and adapted to be actuated by said second camera when in position on said hanger means for energizing the bank of lamps for illuminating only one side of the document, an advancing means for said light sensitive material operatively connected to said drive means for normally moving said material at a synchronous rate with respect to the movement of the document and selectively at an increased synchronous rate with respect to the movement of the document, an identifying station having identifying data, an optical compensating means adapted to be rotated for scanning said identifying station and for directing the scanned image into said exposure station, a second drive means operatively connected to said advancing means for rotating said optical compensating means at a normal predetermined rate and selectively at a decreased rate with respect to the movement of said material, and a control means operatively connected to said advancing means and second drive means and adapted to be actuated by said second camera when in position on said hanger means for selectively permitting said material to be moved at the increased synchronous rate and said optical compensating means to be rotated at the decreased rate.

19. An apparatus for photographically copying either one or both sides of a document and having a photographing station and an exposure station, comprising a drive means for moving a document through said photographing station, an identifying station having a plurality of identifying members, an optical compensating means adapted to be rotated for scanning said identifying station and directing the image of said identifying station into said exposure station, a camera adapted to support a light sensitive material in said exposure station and having an objective with an axis centrally of said material for projecting the image of both sides of the document onto said material and for projecting the image of said identifying data centrally on said material and between the obverse and reverse images of the document, a second camera adapted to support a light sensitive material in said exposure station and having an objective with an axis offset with respect to said material for projecting the image of only one side of the document onto said material and for projecting the image of said identifying data to one side of said material adjacent the image of the document, a hanger means for supporting either of said cameras in optical relation to said optical compensating means, an advancing means for said light sensitive material operatively connected to said drive means for normally moving said material at a synchronous rate with respect to the movement of the document and selectively at an increased synchronous rate with respect to the movement of the document, a second drive means operatively connected to said advancing means for rotating said optical compensating means at a normal predetermined rate and selectively at a decreased rate with respect to the movement of said material, and a control means operatively connected to said advancing means and second drive means and adapted to be actuated by said second camera when in position on said hanger means for selectively permitting said material to be moved at the increased synchronous rate and said optical compensating means to be rotated at the decreased rate.

20. An apparatus for photographically copying either one or both sides of a document and having a photographing station and an exposure station, comprising a drive means for moving a document through said photographing station, an identifying station having a plurality of apertures therein, a plurality of identifying data members in said apertures, an optical compensating means adapted to be rotated for scanning said identifying station, a reflecting means for directing the scanned image of said identifying station into said exposure station, a camera adapted to support a light sensitive material in said exposure station and having an objective with an axis centrally of said material for projecting the image of both sides of the document onto said material and for projecting the image of said identifying data centrally on said material and between the obverse and reverse images of the document, a second camera adapted to support a light sensitive material in said exposure station and having an objective with an axis offset with respect to said material for projecting the image of only one side of the document onto said material and for projecting the image of said identifying data to one side of said material adjacent the image of the document, a hanger means for supporting either of said cameras in optical relation to said optical compensating means and said reflecting means, an advancing means for said light sensitive material operatively connected to said drive means for normally moving said material at a synchronous rate with respect to the movement of the document and selectively at an increased synchronous rate with respect to the movement of the document, a second drive means operatively connected to said advancing means for rotating said optical compensating means at a normal predetermined rate and selectively at a decreased rate with respect to the movement of said material, and a control means operatively connected to said advancing means and second drive means and adapted to be actuated by said second camera when in position on said hanger means for selectively permitting said material to be moved at the increased synchronous rate and said optical compensating means to be rotated at the decreased rate.

21. An apparatus for photographically copying either one or both sides of a document and having a photographing station and an exposure station, comprising a drive means for moving a document through said photographing station, an identifying station having a plurality of identifying members, an optical compensating means adapted to be rotated about an axis in a plane parallel to the plane of said exposure station for scanning said identifying station and directing the image of said identifying station into said exposure station, a camera adapted to support a light sensitive material in said exposure station and having an objective with an axis centrally of said material for projecting the image of both sides of the document onto said material and for projecting the image of said identifying data centrally on said material and between the obverse and reverse images of the document, a second camera adapted to support a light sensitive material in said exposure station and having an objective with an axis offset with respect to said material for projecting the image of only one side of the document onto said material and for projecting the image of said identifying data to one side of said material adjacent the image of the document, a hanger means for supporting either of said cameras in optical relation to said optical compensating means, an advancing means for said light sensitive material operatively connected to said drive means for normally moving said material at a synchronous rate with respect to the movement of the document and selectively at an increased synchronous rate with respect to the movement of the document, a second drive means operatively connected to said advancing means for rotating said optical compensating means at a normal predetermined rate and selectively at a decreased rate with respect to the movement of said material, and a control means operatively connected to said advancing means and second drive means and adapted to be actuated by said second camera when in position on said hanger means for selectively permitting said material to be moved at the increased synchronous rate and said optical compensating means to be rotated at the decreased rate.

22. In an apparatus for photographically copying either one or both sides of a document and having a photographing station and an exposure station, the combination comprising a drive means for moving a document through said photographing station, an identifying station having a plurality of identifying members, an optical compensating means adapted to be rotated about an axis in a plane parallel to the plane of said exposure station for scanning said identifying station and directing the image of said identifying station into said exposure station, a camera adapted to support a light sensitive material in said exposure station and having an objective with an axis centrally of said material for projecting the image of both sides of the document onto said material and for projecting the image of said identifying data centrally on said material and between the obverse and reverse images of the document, a second camera adapted to support a light sensitive material in said exposure station and having an objective with an axis offset with respect to said material for projecting the image of only one side of the document onto said material and for projecting the image of said identifying data to one side of said material adjacent the image of the document, a hanger means for supporting either of said cameras in optical relation to said optical compensating means, an advancing means for said light sensitive material operatively connected to said drive means for normally moving said material at a synchronous rate with respect to the movement of the document and selectively at an increased synchronous rate with respect to the movement of the document, a second drive means operatively connected to said advancing means for rotating said optical compensating means at a normal predetermined rate and selectively at a decreased rate with respect to the movement of said material, and a control means operatively connected to said advancing means and second drive means and adapted to be actuated by said second camera when in position on said hanger means for selectively permitting said material to be moved at the increased synchronous rate and said optical compensating means to be rotated at the decreased rate.

23. An apparatus for photographically copying either one or both sides of a document and having a photographing station and an exposure station, comprising a drive means for moving a document through said photographing station, an identifying station having a plurality of identifying members, an optical compensating means including a plurality of mirrors adapted to be rotated about an axis in a plane parallel to the plane of said exposure station for scanning said identifying station, reflecting means including a second plurality of mirrors positioned to receive the image of said identifying station from said rotating mirrors for directing said image into said exposure station, a camera adapted to support a light sensitive material in said exposure station and having an objective with an axis centrally of said material for projecting the image of both sides of the document onto said material and for projecting the image of said identifying data centrally on said material and between the obverse and reverse images of the document, a second camera adapted to support a light sensitive material in said exposure station and having an objective with an axis offset with respect to said material for projecting the image of only one side of the document onto said material and for projecting the image of said identifying data to one side of said material adjacent the image of the document, a hanger means for supporting either of said cameras in optical relation to said optical compensating means and reflecting means, an advancing means for said light sensitive material operatively connected to said drive means for normally moving said material at a synchronous rate with respect to the movement of the document and selectively at an increased synchronous rate with respect to the movement of the document, a second drive means operatively connected to said advancing means for rotating said optical compensating means at a normal predetermined rate and selectively at a decreased rate with respect to the movement of said material, and a control means operatively connected to said advancing means and second drive means and adapted to be actuated by said second camera when in position on said hanger means for selectively permitting said material to be moved at the increased synchronous rate and said optical compensating means to be rotated at the decreased rate.

24. An apparatus for photographically copying either one or both sides of a document and having a photographing station and an exposure station, comprising a drive means for moving a document through said photographing station, an identifying station having a plurality of identifying members, an optical compensating means including a plurality of mirrors adapted to be rotated about an axis in a plane parallel to the plane of said exposure station for scanning said identifying station, reflecting means including a second plurality of mirrors positioned to receive the image of said identifying station from said rotating mirrors for directing said image into said exposure station, a camera adapted to support a light sensitive material in said exposure station and having an objective with an axis centrally of said material for projecting the image of both sides of the document onto said material and for projecting the image of said identifying data centrally on said material and between the obverse and reverse images of the document, a second camera adapted to support a light sensitive material in said exposure station and having an objective with an axis offset with respect to said material for projecting the image of only one side of the document onto said material and for projecting the image of said identifying data to one side of said material adjacent the image of the document, a hanger means for supporting either of said cameras in optical relation to said optical compensating means and reflecting means, an advancing means for said light sensitive material operatively connected to said drive means for normally moving said material at a synchronous rate with respect to the movement of the document and selectively at an increased synchronous rate with respect to the movement of the document, a second drive means operatively connected to said advancing means for rotating said optical compensating means at a normal predetermined rate and selectively at a decreased rate with respect to the movement of said material, and a control means operatively connected to said advancing means and second drive means and adapted to be actuated by said second camera when in position on said hanger means for selectively permitting said material to be moved at the increased synchronous rate and said optical compensating means to be rotated at the decreased rate.

25. An apparatus for photographically copying a document and having a photographing station and an exposure station, comprising a drive means for moving a document through said photographing station, an arcuate stationary identifying station having stationary identifying members, an optical compensating means including a plurality of mirrors adapted to be rotated about an axis in a plane parallel to the plane of said exposure station and through the center of curvature of said arcuate identifying station for scanning said identifying station, a mirror positioned to receive the scanned image of said identifying station from said optical compensating means, a second mirror positioned to receive said image from said first mirror and for directing said image out of the plane of the identifying station and optical compensating means, a third mirror positioned to receive said image from said second mirror and for directing said image into said exposure station, a camera adapted to support a light sensitive material in said exposure station and having an objective with an axis centrally of said material for projecting the image of both sides of the document onto said material and for projecting the image of said identifying data centrally on said material and between the obverse and reverse images of the document, a second camera adapted to support a light sensitive material in said exposure station and having an objective with an axis offset with respect to said material for projecting the image of only one side of the document onto said material and for projecting the image of said identifying data to one side of said material adjacent the image of the document, a hanger means for supporting either of said cameras in optical relation to said optical compensating means and mirrors, an advancing means for said light sensitive material operatively connected to said drive means for normally moving said material at a synchronous rate with respect to the movement of the document and selectively at an increased synchronous rate with respect to the movement of the document, a second drive means operatively connected to said advancing means for rotating said optical compensating means at a normal predetermined rate and selectively at a a decreased rate with respect to the movement of said material, and a control means operatively connected to said advancing means and second drive means and adapted to be actuated by said second camera when in position on said hanger means for selectively permitting said material to be moved at the increased synchronous rate and said optical compensating means to be rotated at the decreased rate.

26. An apparatus for photographically copying a document and having a photographing station and an exposure station, comprising a drive means for moving a document through said photographing station, an arcuate stationary identifying station having stationary identifying members, an optical compensating means including a plurality of mirrors adapted to be rotated about an axis in a plane parallel to the plane of said exposure station and through the center of curvature of said arcuate identifying station for scanning said identifying station, a mirror positioned to receive the scanned image of said identifying station from said optical compensating means, a second mirror positioned to receive said image from said first mirror and for directing said image out of the plane of the identifying station and optical compensating means, a third mirror positioned to receive said image from said second mirror and for directing said image into said exposure station, a camera adapted to support a light sensitive material in said exposure station and having an objective with an axis centrally of said material for projecting the image of both sides of the document onto said material and for projecting the image of said identifying data centrally on said material and between the obverse and reverse images of the document, a second camera adapted to support a light sensitive material in said exposure station and having an objective with an axis offset with respect to said material for projecting the image of only one side of the document onto said material and for projecting the image of said identifying data to one side of said material adjacent the image of the document, a hanger means for supporting either of said cameras in optical relation to said optical compensating means and mirrors, an advancing means for said light sensitive material operatively connected to said drive means for normally moving said material at a synchronous rate with respect to the movement of the document and selectively at an increased synchronous rate with respect to the movement of the document, a second drive means operatively connected to said advancing means for rotating said optical compensating means at a normal predetermined rate and selectively at a decreased rate with respect to the movement of said material, and a control means operatively connected to said advancing means and second drive means and adapted to be actuated by said second camera when in position on said hanger means for selectively permitting said material to be moved at the increased synchronous rate and said optical compensating means to be rotated at the decreased rate.

27. An apparatus for photographically copying either one or both sides of a document and having a photographing station and an exposure station, comprising means for supporting the document in said photographing station, a drive means for continuously moving a document through said photographing station, reflecting means adjacent and on each side of said photographing station and for receiving respectively the images of the obverse and reverse sides of the document in said photographing station, a camera adapted to support a light-sensitive material in said exposure station and having an objective with an axis centrally of said material for projecting the images of both sides of the document onto said material, a second camera adapted to support a light-sensitive material in said exposure station and having an objective with an axis offset with respect to the center of said material for projecting the image of only one side of the document onto said material, a hanger means for supporting either of said cameras in optical relation to said reflecting means and photographing station, an advancing means for said light sensitive material operatively connected to said drive means for normally moving said material at a synchronous rate with respect to the movement of the document and selectively at an increased synchronous rate with respect to the movement of the document, and a control means operatively connected to said advancing means and adapted to be actuated by said second camera when in position on said hanger means for selectively permitting said material to be moved at the increased synchronous rate.

28. An apparatus for photographically copying either one or both sides of a document and having a photographing station and an exposure station, comprising a driving means for continuously moving the document through said photographing station, reflecting means adjacent and on each side of said photographing station and for receiving respectively the images of the obverse and reverse sides of the document in said photographing station, a camera adapted to support a light-sensitive material in said exposure station and having an objective with an axis centrally of said material for projecting the image of both sides of the document onto said material, a second camera adapted to support a light-sensitive material in said exposure station and having an objective with an axis offset with respect to the center of said material for projecting the image of only one side of the document onto said material, hanger means for supporting either of said cameras in optical relation to said reflecting means and photographing station, an advancing means for said light sensitive material operatively connected to said drive means for normally moving said material at a synchronous rate with respect to the movement of the document and selectively at an increased synchronous rate with respect to the movement of the document, and a control means operatively connected to said advancing means and adapted to be actuated by said second camera when in position on said hanger means for selectively permitting said material to be moved at the increased synchronous rate.

29. An apparatus for photographically copying either one or both sides of a document and having a photographing station and an exposure station, comprising means for supporting the document in said photographing station, a drive means for continuously moving a document through said photographing station, reflecting means adjacent and on each side of said photographing station and for receiving respectively the images of the obverse and reverse sides of the document in said photographing station, a camera adapted to support a light-sensitive material in said exposure station and in a plane parallel to the plane of the document when in said photographing station and having an objective with an axis centrally of said material for projecting the image of both sides of the document onto said material, a second camera adapted to support a light-sensitive material in said exposure station and in a plane parallel to the plane of the document when in said photographing station and having an objective with an axis offset with respect to the center of said material for projecting the image of only one side of the document onto said material, a second reflecting means between said first reflecting means and camera for receiving the obverse and reverse images of the document and for directing said images to said camera, a hanger means for supporting either of said cameras in optical relation to both of said reflecting means and photographing station, an advancing means for said light sensitive material operatively connected to said drive means for normally moving said material at a synchronous rate with respect to the movement of the document and selectively at an increased synchronous rate with respect to the movement of the document, and a control means operatively connected to said advancing means and adapted to be actuated by said second camera when in position on said hanger means for selectively permitting said material to be moved at the increased synchronous rate.

30. An apparatus for photographically copying either one or both sides of a document and having a photographing station and an exposure station, comprising a driving means for continuously moving the document through said photographing station, reflecting means adjacent and on each side of said photographing station and for receiving respectively the images of the obverse and reverse sides of the document in said photographing station, a camera adapted to support a light-sensitive material in said exposure station and in a plane parallel to the plane of the document when in said photographing station and having an objective with an axis centrally of said material for projecting the image of both sides of the document onto said material, a second camera adapted to support a light-sensitive material in said exposure station and in a plane parallel to the plane of the document when in said photographing station and having an objective with an axis offset with respect to the center of said material for projecting the image of only one side of the document onto said material, a second reflecting means between said first reflecting means and camera for receiving the obverse and reverse images of the document and for directing said images to said camera, a hanger means for supporting either of said cameras in optical relation to both of said reflecting means and photographing station, an advancing means for said light sensitive material operatively connected to said drive means for normally moving said material at a synchronous rate with respect to the movement of the document and selectively at an increased synchronous rate with respect to the movement of the document, and a control means operatively connected to said advancing means and adapted to be actuated by said second camera when in position on said hanger means for selectively permitting said material to be moved at the increased synchronous rate.

31. An apparatus for photographically copying either one or both sides of a document and having a photographing station and an exposure station, comprising means for supporting the document in said photographing station, a drive means for continuously moving a document through said photographing station, reflecting means adjacent and on each side of said photographing station and for receiving respectively the images of the obverse and reverse sides of the document in said photographing station, an identifying station having a plurality of identifying members, an optical compensating means for scanning said identifying station and directing the image of said identifying station into said exposure station, a camera adapted to support a light-sensitive material in said exposure aperture and having an objective with an axis centrally of said material for projecting the image of the obverse and reverse sides of the document onto said material in spaced-apart relationship and the image of said identifying station centrally on said material between said obverse and reverse images of the document, a second camera adapted to support a light-sensitive material in said exposure station and having an objective with an axis offset with respect to said material for projecting the image of only one side of the document onto said material and the image of said identifying station to one side of said material adjacent the image of the document, a hanger means for supporting either of said cameras in optical relation to said photographic station, reflecting means and optical compensating means, an advancing means for said light sensitive material operatively connected to said drive means for normally moving said material at a synchronous rate with respect to the movement of the document and selectively at an increased synchronous rate with respect to the movement of the document, a second drive means operatively connected to said advancing means for rotating said optical compensating means at a normal predetermined rate and selectively at a decreased rate with respect to the movement of said material, and a control means operatively connected to said advancing means and second drive means and adapted to be actuated by said second camera when in position on said hanger means for selectively permitting said material to be moved at the increased synchronous rate and said optical compensating means to be rotated at the decreased rate.

32. An apparatus for photographically copying either one or both sides of a document and having a photographing station and an exposure station, comprising a driving means for continuously moving the document through said photographing station, reflecting means on each side of said photographing station and angularly disposed with respect thereto for receiving respectively the images of the obverse and reverse sides of the document in said photographing station, a second reflecting means positioned to receive the obverse and reverse images of the document and for directing said images into said exposure station, an identifying station having a plurality of identifying members, an optical compensating means adapted to be rotated for scanning said identifying station, a reflecting system for directing the scanned image of said identifying station into said exposure aperture, a camera adapted to support a light-sensitive material in said exposure aperture and having an objective with an axis centrally of said material for projecting the image of the obverse and reverse sides of the document onto said material in spaced-apart relationship and the image of said identifying station centrally on said material between said obverse and reverse images of the document, a second camera adapted to support a light-sensitive material in said exposure station and having an objective with an axis offset with respect to said material for projecting the image of only one side of the document onto said material and the image of said identifying station to one side of said material adjacent the image of the document, a hanger means for supporting either of said cameras in optical relation to said photographing station, reflecting means, second reflecting means, optical compensating means, and reflecting system, an advancing means for said light sensitive material operatively connected to said drive means for normally moving said material at a synchronous rate with respect to the movement of the document and selectively at an increased synchronous rate with respect to the movement of the document, a second drive means operatively connected to said advancing means for rotating said optical compensating means at a normal predetermined rate and selectively at a decreased rate with respect to the movement of said material, and a control means operatively connected to said advancing means and second drive means and adapted to be actuated by said second camera when in position on said hanger means for selectively permitting said material to be moved at the increased synchronous rate and said optical compensating means to be rotated at the decreased rate.

33. In an apparatus for photographically copying either one or both sides of a document and having a photographing station and an exposure station, comprising means for supporting the document in said photographing station, a drive means for continuously moving a document through said photographing station, a mirror positioned on each side of said photographic station and angularly disposed with respect thereto for receiving respectively the images of the obverse and reverse sides of the document in said photographing station, a mirror positioned between said first mentioned mirrors and said exposure station to receive the obverse and reverse images of the document and for directing said images into said exposure station, an identifying station having a plurality of identifying members, an optical compensating means adapted to be rotated about an axis in a plane parallel to the plane of said exposure station for scanning said identifying station and directing the image of said identifying station into said exposure station, a camera adapted to support a light-sensitive material in a plane parallel to the plane of the document when in said photographing station and having an objective with an exis centrally of said material for projecting the image of the obverse and reverse sides of the document onto said material in spaced-apart relationship and the image of said identifying station centrally on said material between said obverse and reverse images of the document, a second camera adapted to support a light-sensitive material in a plane parallel to the plane of the document when in said photographing station and having an objective with an axis offset with respect to said material for projecting the image of only one side of the document onto said material and the image of said identifying station to one side of said material adjacent the image of the document, a hanger means for supporting either of said cameras in optical relation to said photographing station, mirrors, and optical compensating means, an advancing means for said light sensitive material operatively connected to said drive means for normally moving said material at a synchronous rate with respect to the movement of the document and selectively at an increased synchronous rate with respect to the movement of the document, a second drive means operatively connected to said advancing means for rotating said optical compensating means at a normal predetermined rate and selectively at a decreased rate with respect to the movement of said material, and a control means operatively connected to said advancing means and second drive means and adapted to be actuated by said second camera when in position on said hanger means for selectively permitting said material to be moved at the increased synchronous rate and said optical compensating means to be rotated at the decreased rate.

34. An apparatus for photographically copying either one or both sides of a document and having a photographing station and an exposure station, comprising a drive means for continuously moving the document through said photographing station, a mirror positioned on each side of said photographic station and angularly disposed with respect thereto for receiving respectively the images of the obverse and reverse sides of the document in said photographing station, a mirror positioned between said first mentioned mirrors and said exposure station to receive the obverse and reverse images of the document and for directing said images into said exposure station, an arcuate identifying station having stationary data, an optical compensating means including a plurality of mirrors adapted to be rotated about an axis in a plane parallel to the plane of said exposure station and through the center of curvature of said identifying station for scanning said identifying station, a plurality of mirrors positioned to receive the scanned image of said identifying station and for directing said image into said exposure station, a camera adapted to support a light-sensitive material in a plane parallel to the plane of the document when in said photographing station and having an objective with an axis centrally of said material for projecting the image of the obverse and reverse sides of the document onto said material in spaced-apart relationship and the image of said identifying station centrally on said material between said obverse and reverse images of the document, a second camera adapted to support a light-sensitive material in a plane parallel to the plane of the document when in said photographing station and having an objective with an axis offset with respect to said material for projecting the image of only one side of the document onto said material and the image of said identifying station to one side of said material adjacent the image of the document, a hanger means for supporting either of said cameras in optical relation to said photographing station, mirrors, and optical compensating means, an advancing means for said light sensitive material operatively connected to said drive means for normally moving said material at a synchronous rate with respect to the movement of the document and selectively at an increased synchronous rate with respect to the movement of the document, a second drive means operatively connected to said advancing means for rotating said optical compensating means at a normal predetermined rate and selectively at a decreased rate with respect to the movement of said material, and a control means operatively connected to said advancing means and second drive means and adapted to be actuated by said second camera when in position on said hanger means for selectively permitting said material to be moved at the increased synchronous rate and said optical compensating means to be rotated at the decreased rate.

35. An apparatus for photographically copying either both or only one side of a document and having a photographing station and an exposure station, comprising means for supporting the document in said photographing station, a drive means for continuously moving a document through said photographing station, reflecting means adjacent and on each side of said photographing station and for receiving respectively the images of the obverse and reverse side of the document in said photographing station, a hanger means for supporting either of two cameras in optical relation to said reflecting means and said photographing station, one of said cameras being adapted to support a light-sensitive material in said exposure station when positioned on said hanger means and for photographing both sides of said document, and the other of said cameras being adapted to support a light-sensitive material in said exposure station when positioned on said hanger means and for photographing only one side of said document, an advancing means for said light sensitive material operatively connected to said drive means for normally moving said material at a synchronous rate with respect to the movement of the document and selectively at an increased synchronous rate with respect to the movement of the document, and a control means operatively connected to said advancing means and adapted to be actuated by said second camera when in position on said hanger means for selectively permitting said material to be moved at the increased synchronous rate.

36. An apparatus for photographically copying either both or only one side of a document and having a photographing station and an exposure station, comprising a driving means for continuously moving the document through said photographing station, reflecting means adjacent and on each side of said photographing station and for receiving respectively the images of the obverse and reverse sides of the document in said photographing station, an advancing means for a light-sensitive material operatively connected to said drive means for normally moving said material at a synchronous rate with respect to the movement of the document and selectively at an increased rate with respect to the movement of the document, a control means operatively connected to said advancing means for permitting said material to be moved at an increased synchronous rate with respect to the movement of the document, a hanger means including a drive member operatively connected to said advancing means and a movable member for actuating said control means and for supporting either of two cameras in optical relationship to said reflecting means and photographing station, one of said cameras being adapted to contain and to support a light-sensitive material in said exposure station for photographing both sides of the document and having a material advancing member adapted to engage said drive member when positioned on said hanger means, and the other of said cameras being adapted to contain and to support a light-sensitive material in said exposure aperture for photographing only one side of the document and having a material advancing member adapted to engage said drive member and an operating portion for moving said member when positioned on said hanger means.

JOHN F. EGAN.
GEORGE S. JONES.

REFERENCES CITED

The following references are of record in the file of this patent:

UNITED STATES PATENTS

| Number | Name | Date |
| --- | --- | --- |
| 1,391,807 | Swalm | Sept. 27, 1921 |
| 1,826,664 | Hopkins | Oct. 6, 1931 |
| 1,987,064 | Hopkins | Jan. 8, 1935 |
| 2,177,135 | Fassel | Oct. 24, 1939 |

FOREIGN PATENTS

| Number | Country | Date |
| --- | --- | --- |
| 834,651 | France | Aug. 29, 1938 |